United States Patent
Severson et al.

(10) Patent No.: US 9,754,631 B2
(45) Date of Patent: Sep. 5, 2017

(54) DISC DRIVE APPARATUS WITH HERMETICALLY SEALED CAVITY

(71) Applicant: Seagate Technology LLC, Cupertino, CA (US)

(72) Inventors: Samuel Edward Severson, Longmont, CO (US); David G. Fitzgerald, Lafayette, CO (US); David Ray Lapp, Boulder, CO (US); Jerome Thomas Coffey, Boulder, CO (US); Robert M. Gibbs, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/843,220

(22) Filed: Sep. 2, 2015

(65) Prior Publication Data

US 2017/0062019 A1 Mar. 2, 2017

(51) Int. Cl.
*G11B 33/14* (2006.01)
*B23K 20/12* (2006.01)
*B23K 20/00* (2006.01)

(52) U.S. Cl.
CPC ........ *G11B 33/1486* (2013.01); *B23K 20/002* (2013.01); *B23K 20/122* (2013.01); *G11B 33/14* (2013.01)

(58) Field of Classification Search
CPC ..... G11B 33/12; G11B 33/14; G11B 33/1466; G11B 33/1486

USPC ........... 360/99.15, 99.16, 99.18, 99.2, 99.21, 360/99.22; 720/648, 655
See application file for complete search history.

(56) References Cited

U.S. PATENT DOCUMENTS

| | | | |
|---|---|---|---|
| 7,146,713 B1 | 12/2006 | Ying | |
| 7,508,682 B2 * | 3/2009 | Badarinarayan | ... B23K 20/1265 361/752 |
| 8,279,552 B2 | 10/2012 | Stipe | |
| 2005/0199372 A1 | 9/2005 | Frazer et al. | |
| 2005/0270690 A1 | 12/2005 | Gunderson | |
| 2007/0183088 A1 * | 8/2007 | Hatchett | ............ G11B 33/1466 360/99.21 |
| 2008/0045065 A1 * | 2/2008 | O'Connor | .............. H01R 4/029 439/271 |
| 2008/0053700 A1 * | 3/2008 | O'Connor | ............ B23K 20/122 174/564 |
| 2008/0310116 A1 * | 12/2008 | O'Connor | ............. H01L 23/473 361/707 |
| 2012/0275054 A1 | 11/2012 | McGuire, Jr. et al. | |
| 2015/0332733 A1 * | 11/2015 | Lapp | .................. G11B 33/1486 360/99.08 |

\* cited by examiner

*Primary Examiner* — Carlos E Garcia
(74) *Attorney, Agent, or Firm* — Crawford Maunu PLLC

(57) ABSTRACT

Certain exemplary aspects of the present disclosure are directed towards a disc drive apparatus. A base deck and a cover are joined to one another by a friction-stir weld along a lip of the cover that extends along a periphery of the cover and over a surface of the base deck. The base deck and cover enclose a cavity, which is hermetically sealed by the weld.

20 Claims, 5 Drawing Sheets

DISC DRIVE APPARATUS WITH HERMETICALLY SEALED CAVITY

SUMMARY

Various example embodiments are directed to apparatuses and/or methods that facilitate the welding of components with relatively low permeability, and may be implemented under conditions in which material, size/spacing for the welding, and welding techniques may impact welding and the resulting permeability. Certain embodiments achieve low weld permeability by implementing advanced welding techniques, enhancing the welding depth of components, and utilizing materials and joints with improved welding characteristics, such as may be implemented to address porosity and other weld-related defects that may affect the ability of a weld to hermetically seal a cavity. In some implementations, such approaches are achieved while also limiting or reducing overall width of a weld between components. One or more of these embodiments may be particularly applicable, for example, to disc drives in which a weld between a base deck and a cover operates to mitigate or prevent the escape of low density atmosphere from within a disc drive cavity or the introduction of external atmosphere into the disc drive cavity, while also achieving compact construction. In these contexts, such a weld may be formed in a variety of manners, such as using friction-stir welding techniques and which may exhibit structure corresponding to such techniques.

Various example embodiments are directed to disc drive apparatuses including a base deck and a cover that hermetically seals a cavity within the base deck and with disc drive components in the cavity, in which the base deck and the cover are joined with a friction-stir weld. In many embodiments, the base deck includes a cavity that is enclosed by the cover. The cover includes a lip that extends along a periphery of the cover and over a surface of the base deck. The friction-stir weld joins the lip of the cover to the base deck, and includes a portion of material from the lip blended with a portion of material from the base deck. In many embodiments, the friction-stir weld extends through the lip and into a portion of the cover along which the lip extends.

Various aspects of the present disclosure are directed to methods of manufacturing a hermetically sealed disc drive. In one such embodiment, a base deck is provided with a cavity containing disc drive components, and a cover enclosing the disc drive components within the cavity. The cavity is then hermetically sealed by joining the cover to the base deck via friction-stir welding. In more detailed embodiments, the cavity is hermetically sealed by contacting both the cover and the base deck with a friction-stir weld tool rotating at greater than 12,000 rotations per minute.

Other methods of the present disclosure are directed to manufacturing a hermetically sealed disc drive in which component/system testing is carried out prior to sealing the disc drive. This approach can allow for re-working of the disc drive (if necessary), thereby mitigating scrap. In one such embodiment, a first (removable) seal is applied to a base deck having a cavity containing a disc drive assembly. The first seal acts to (temporarily) retain a low density atmosphere in the cavity at a pressure higher, lower, or equal to a standard earth atmospheric pressure, allowing the disc drive to be tested in the low density atmosphere and for proper operation to be verified prior to welding (e.g., friction-stir welding) a cover that hermetically and permanently seals the cavity. Once the first seal is applied, operation of the disc drive assembly is verified by testing the assembly while using the first seal to enclose a low density atmosphere within the cavity. If the test indicates a failure of the disc drive, the first seal is removed, the disc drive assembly reworked (if possible), and a second seal is applied to the base deck. The second seal also retains a low density atmosphere in the cavity, similar to the first seal. The disc drive is then re-tested. This testing, seal removal and re-sealing can be carried out several times. Once proper operation of the disc drive assembly is verified, the cavity is hermetically sealed by joining the cover to the base deck, such as via a friction-stir weld as characterized herein.

In some implementations, a disc drive utilizes wrought materials for the base deck (e.g., aluminum alloy 6061), and another different wrought material for the cover (e.g., aluminum alloy 5052). This combination of alloys, when welded, facilitates a reduced porosity within the resulting friction-stir weld. This reduced porosity is due in part to the varying alloys facilitating re-alloying of the weld, which is associated with reduced porosity growth and joining due to stress cracking. Resulting low permeability of the friction-stir weld allows for a significant reduction in weld depth and thickness (necessary for a desired leak rate), which is beneficial given the limited coupling area available for many disc drive applications. In many embodiments, low porosity wrought aluminum alloys compatible with extrusion and forging methods are used to facilitate welding. Using approaches as described herein, the effective yield rate of hermetically sealed disc drive assemblies is substantially enhanced, addressing various problems such as those discussed herein.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
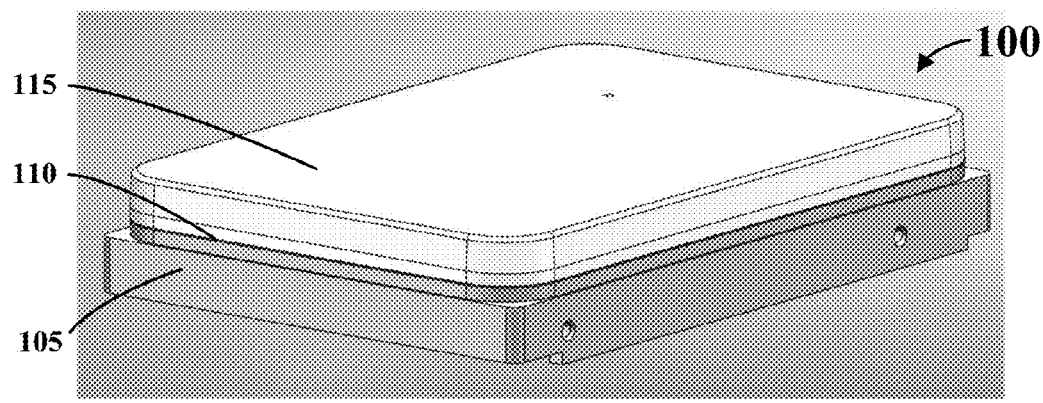
FIG. 1A is an isometric view of a disc drive apparatus, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements involving joint welding and hermetically sealed cavities, as may be implemented for sealing disc drives. Specific embodiments are believed to be particularly beneficial to sealed disc drives, such as those containing low density atmosphere (e.g., a helium-based atmosphere). While the present invention is not necessarily so limited, various aspects of the invention may be appreciated through a discussion of examples using this context.

Various example embodiments are directed to apparatuses and/or methods that facilitate the hermetic sealing of components, via a weld, with relatively low permeability. Such embodiments generally include conditions in which material, size/spacing for the weld, and welding techniques may undesirably impact the resulting weld and its permeability. Certain embodiments achieve low weld permeability by implementing advanced welding techniques, enhancing the welding depth of components, and utilizing materials and joints with improved welding characteristics. These approaches can address porosity and other weld-related defects that may affect the ability of a weld to hermetically seal a cavity. In some implementations, the reduced porosity of the weld may allow for the weld dimensions to be reduced, while maintaining a desired leak rate.

One or more of these embodiments may be particularly applicable, for example, to disc drives in which the bond between a base deck and a cover operates to mitigate or prevent the passage of air or other gas into or out of the disc drive, maintaining a low density atmosphere within the disc drive while also achieving compact construction. In conjunction with one or more such embodiments, it has been discovered that an approach involving specific friction-stir welding implementations can achieve a bond that is substantially free of voids, cracks, and porosity, that may otherwise increase a leakage rate of low density atmosphere from within the disc drive and/or passage of undesirable material/atmosphere into the disc drive. Friction-stir welding as used herein may, for example, involve the introduction of additional materials into a weld zone of the base deck material and the cover material to further assist re-alloying of the resulting weld and its physical characteristics. In connection with one or more such embodiments, it has been discovered that friction-stir welding can be carried out using high-speed tooling on relatively thin and/or low-strength materials, while achieving desirable welds.

In further more specific embodiments, a base deck as characterized herein includes features such as structural features, turbulence reducing features and air filter mounts. These features may have an impact on the sidewall thickness along a periphery of the based deck. In some implementations, welds are implemented relative to these features such that a resulting friction-stir weld depth may vary greatly. Accordingly, a varying weld depth that follows one or more such base deck features proximate the weld can be implemented to ensure that the weld does not interfere with or otherwise adversely affect the features. Where allowable by proximate features, the weld depth may be increased to facilitate localized reduced atmosphere leakage from the cavity or leakage of air/gas into the cavity, which may extend the useful life of the disc drive. Such embodiments may be used in applications where extended life of the disc drive is desirable (e.g., data archiving and "cold storage"), and low-density atmosphere leakage from the disc drive is maintained at a rate of less than 1%/year of the volumetric low-density atmosphere within the disc drive cavity. It has been discovered that the escape of more than 5% of the volumetric low-density atmosphere from within the disc drive cavity can begin to affect performance characteristics of the drive (e.g., power usage, fly-height of the slider, and operating temperature). Similarly, the influx of external atmosphere into the disc drive can cause similar issues (e.g., with similar rates of material passage into the disc drive). Increased weld depth, where allowed by proximate base deck features, can also strengthen the disc drive against vibration and shock events that may damage the friction-stir weld, via stress cracking, compromising the hermetic seal of the disc drive.

In many embodiments, a cavity between a base deck and a cover holds an amount of low density atmosphere, and a friction-stir weld hermetically seals the cavity to maintain a rate of atmosphere leakage from or into the cavity that is not greater than 1% of the initial volume of atmosphere in the drive cavity or 1 $cm^3$/year ($1\times10^{-8}$ $cm^3$/sec) for a 3.5" form factor disc drive (e.g., with an initial 100 $cm^3$ of low-density atmosphere injected in to the cavity). Such a leakage rate may be sufficient to maintain the volume within the cavity at 95% of the initial low-density atmosphere over a life of the disc drive.

Various embodiments are directed to disc drive apparatuses including a base deck and a cover hermetically seals a cavity within the base deck, with disc drive components therein, with the cover and the base deck joined by a friction-stir weld. In such an embodiment, the cover includes a lip that extends along a periphery of the cover and extends over a surface of the base deck to enclose the cavity within the base deck. A friction-stir weld tool forms the weld by generating heat between the tool, the cover, and the base deck. Specifically, the tool mechanically mixes and joins the base deck and the lip using mechanical pressure to soften regions of the lip and the base deck in contact with and adjacent the tool, and blends a portion of material from the lip with a portion of material from the base deck. In many embodiments, the friction-stir weld extends through the lip and into a portion of the cover along which the lip extends.

Various example embodiments are directed to methods and/or apparatuses in which a hermetic seal is provided between a base deck and cover of a disc drive by friction-stir welding different materials together. The use of different metal alloys facilitates enhanced re-alloying characteristics of a friction-stir weld joining the base deck and the cover. In such an embodiment, the weld zone and resulting weld include a portion of a first material of the base deck and a portion of a second material from the cover. Re-alloying of the weld provides a number of beneficial weld characteristics, such as for embodiments where the weld is used to produce a hermetic seal. For example, the re-alloyed weld exhibits reduced weld porosity, such porosity being associated with higher rates of atmospheric leakage from within or into a sealed cavity. The blending of different alloys in the weld zone have been found to be particularly beneficial where both the base deck and the cover are formed of aluminum.

In some embodiments, the friction-stir weld utilizes a first material for a base deck (e.g., aluminum alloy 6061), and another material for a cover of a disc drive (e.g., aluminum alloy 5052 or another alloy different then the first material). In some embodiments, the first and second material may be the same material, and in other embodiments a third material is added to the weld (e.g., with the first and second material being the same or different). Different metals or alloys of a metal may be used in connection with one another to facilitate enhanced weld properties such as reduced occurrences of permeability paths associated with porosity growth and stress cracking, which may be caused by thermal cycles of the disc drive and the welding process itself. The reduced porosity of the weld may allow for a significantly decreased weld area which is desirable given the limited disc drive area available for weld joints. Friction stir welding in this context may facilitate joining metals that are not otherwise readily joined using other processes. In many embodiments, low porosity aluminum alloys compatible with extrusion and forging methods, laser welding, dip or vacuum oven aluminum brazing, or soldering can be utilized, making manufacturing transitions to friction-stir welding techniques for hermetically sealing disc drives minimally disruptive. Using approaches as described herein, the effective yield rate of hermetically sealed disc drive assemblies is substantially enhanced, addressing various problems including those related to welding die-cast aluminum parts (with surface oxidation and/or e-plating) and other problems discussed herein.

In one specific embodiment, a base deck and a cover are made of a first aluminum alloy, and a second, different type of aluminum alloy is introduced to and used in forming a weld that joins the base deck and the cover. In other embodiments, the base deck and cover are respectively made of first and second types of alloys. This second type of aluminum alloy may facilitate re-alloying, and mitigate hot cracking of the weld. For instance, shim(s) or filler of the second type of aluminum alloy may be placed between components. The resulting weld exhibits minimal porosity and stress cracking.

In connection with various embodiments, it has also been discovered that increasing the dimensions of a weld joint, such as width or depth (where allowed), in conjunction with porosity characteristics of the weld significantly reduces the leakage rate of atmosphere from within a disc drive. To increase the width or depth of the weld zone, a friction-stir weld tool with variable length/width is plunged into the weld zone, with the length/width being set and/or otherwise controlled to achieve a desired dimension of the weld zone. This approach can be used to mitigate passage of gas into or out of the cavity via the friction-stir weld. For instance, the weld depth/width can be varied (e.g., along a periphery of the disc drive) according to available thickness of one or more features of the base deck proximate the weld. The increased weld zone can reduce an overall rate of gas permeation through the weld.

The use of friction-stir welding to seal a cavity of a base deck with a cover as characterized herein may provide a number of process-related benefits. For example, such a weld process can be implemented in a manner that is far less susceptible to contaminants and therefore requires less stringent cleaning processes. Oxidation or e-plating at the weld site need not be machined-off prior to welding. The inclusion of such surface conditions and contaminants does not significantly increase occurrences of hot cracking, porosity, or have any other effect on the resulting weld seal.

In one specific embodiment of the present disclosure, a base deck of a disc drive apparatus includes a bottom portion having sidewalls extending therefrom, with the bottom portion and the sidewalls defining a cavity within. A cover encloses the cavity within the base deck, and includes a first portion that extends over the cavity and a second portion that includes a lip. The lip forms an elongated portion that extends along a periphery of the sidewalls. A friction-stir weld joins the lip to the sidewalls along the periphery of the sidewalls, thereby hermetically sealing the cavity. In further embodiments, the friction-stir weld joins the cover to the base deck along a lap joint interface between the cover and the base deck. The lap joint interface provides an elongated weld interface between the base deck and the cover which further reduces the leak rate of the friction-stir weld. Beyond the friction-stir weld, the lap joint forms a mechanical labyrinth between the lip of the cover and the sidewall of the base deck which restricts gas permeability through the friction-stir weld.

Various aspects of the present disclosure are directed to methods of manufacturing a hermetically sealed disc drive. In one such embodiment, a method includes providing a base deck with a cavity containing disc drive components, and hermetically sealing the disc drive components within the cavity by joining a cover and the base deck via friction-stir welding. In more detailed embodiments, the cover is joined to the base deck by contacting both the cover and the base deck with a friction-stir weld tool rotating at greater than 12,000 rotations per minute ("RPM") to soften regions of the cover and the base deck and blend material from the cover with material from the base deck. The use of the friction-stir weld at or above 12,000 RPMs generates a higher temperature, which can facilitate blending at relatively reduced forging force (pressure of the friction-stir weld tool). Accordingly, various embodiments may utilize base decks with relatively thin sidewalls that may yield under large forging pressures (e.g., as may be necessary at lower RPM). The use of larger tool RPMs also eliminates the need for a backing plate to support the sidewalls of the base deck during the welding process, simplifying and decreasing the time necessary to complete the welding process.

In yet further embodiments, a disc drive cavity having disc drive components within a base deck is hermetically sealed by friction-stir welding a cover to the base deck, while mitigating over-heating and failure of disc drive components within the cavity by cooling the disc drive. Many disc drive components include electro-mechanical parts that are susceptible to failure at temperatures produced by friction-stir welding tools. Accordingly, cooling of the disc drive by heat sink, liquid cooling, or other methods effectively transports heat from the weld joint away from the disc drive components, maintaining temperatures within the cavity within safe operating temperatures of the disc drive components. In some implementations, vibration isolation is used to mitigate vibrations induced by the friction-stir weld tool while hermetically sealing the cavity. Using this approach, vibrations can be held below a level that may otherwise exceed non-operational vibration and shock limitations of the disc drive and cause damage or failure.

It has further been discovered that operating the friction-stir weld tool at an angle, relative to a welded surface of the cover, of greater than seven degrees more thoroughly blends a portion of material from the cover with a portion of material from the base deck. This blending can reduce or minimize discontinuities and the effects of contaminants on the weld. The angle of the tool also facilitates the use of a cover with a lip of minimal depth.

During friction-stir welding of a disc drive base deck to a cover, embodiments of the present disclosure solve problems related to inconsistent weld depth (and incomplete welds). It has been learnt that inconsistent weld depth is often associated with friction-stir weld tool forces on the base deck and the cover that are insufficient to form a hermetically sealed weld. Aspects of the present disclosure solve such problems by maintaining a minimum threshold tool force on the base deck and the cover sufficient to weld through the cover and into at least a portion of the base deck along a length of the friction-stir weld. In various embodiments, a high RPM is used in connection with a relatively low threshold tool force to ensure proper welding while limiting the amount of force that is applied.

Turning now to the figures, various embodiments of the present disclosure are presented by way of the illustrations. FIG. 1A is an isometric view of a disc drive apparatus 100, consistent with various aspects of the present disclosure. The disc drive apparatus 100 includes a base deck 105 that houses disc drive components. A cover 115 is coupled to the base deck 105 via a friction-stir weld 110 that runs along a periphery of a joint between the cover and the base deck. The cover 115 and friction-stir weld 110 hermetically seal the disc drive components within a cavity defined by the base deck 105 and the cover. In many embodiments, the friction-stir weld 110 seals a low-density atmosphere (e.g., helium gas) within the cavity of the disc drive apparatus 100, and mitigates or prevents the passage of the atmosphere out of the cavity and/or the passage of gas into the cavity. The friction-stir weld 110 exhibits desirable characteristics such as may relate to decreased porosity and hot cracking, which greatly affects the low-density atmosphere leak rate of a weld.

Figure 1B:
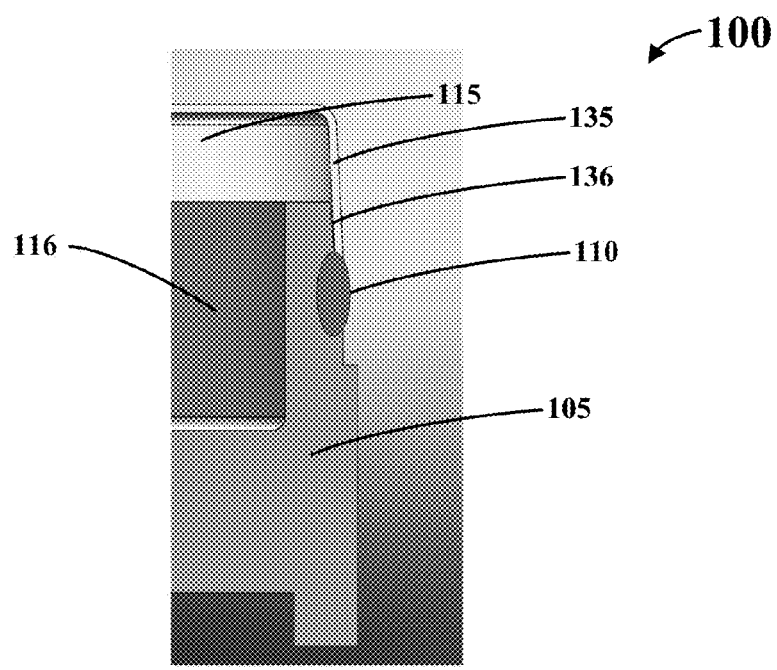
FIG. 1B is a partial cross-sectional view of the disc drive apparatus in FIG. 1A, consistent with various aspects of the present disclosure.

FIG. 1B is a partial cross-sectional view of a disc drive apparatus 100, consistent with various aspects of the present disclosure. The disc drive apparatus 100 includes a base deck 105 and a cover 115 that interface via a lap joint. The interface is joined by a friction-stir weld 110 that secures the cover 115 to the base deck 105 and hermetically seals a cavity 116 from an atmosphere outside the disc drive apparatus 100. The friction-stir weld 110 extends through the lip 135 of the cover 115, into the base deck 105, and around a perimeter of the lap joint. In such an embodiment, the friction-stir weld 110 blends the material of the lip 135 and the base deck 105 with minimal discontinuities that would allow for the escape of gas into/out of the cavity 116.

To further limit the exchange of gases from within the disc drive cavity 116, the lip 135 of the cover 115, and the base deck 105 may be formed with a mechanical labyrinth 136 on an interior of the disc drive which restricts the flow of atmosphere through the friction-stir weld 110, between the cavity and an environment external to the disc drive. In combination with the mechanical labyrinth 136, the friction-stir weld mitigates the passage of the low-density atmosphere from within the cavity 116 and/or the penetration of an external atmosphere into the cavity.

In some embodiments involving the disc drive apparatus of FIG. 1B, cover 115 includes a 4000 series aluminum alloy that is stirred with a 6000 series aluminum alloy from base deck 105. In other embodiments the cover 1115 and base deck 105 have a common type of metal, with a different type of metal being stirred into the weld. It has been discovered that the use of different metals (e.g., different aluminum alloys) facilitates re-alloying of the friction-stir weld 110, and limits discontinuities such as pores and hot cracks (which can become pathways for the escape of low-density atmosphere from within the disc drive 100).

Figure 2:
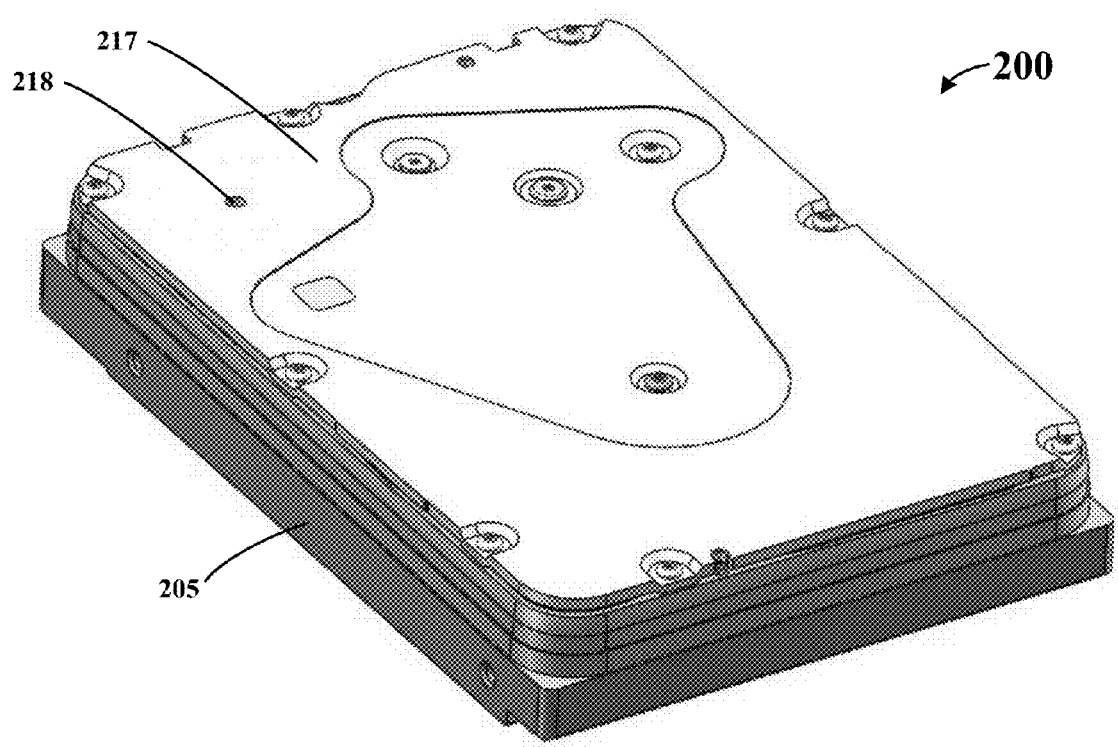
FIG. 2 is an isometric view of a partially assembled disc drive apparatus, consistent with various aspects of the present disclosure.

FIG. 2 is an isometric view of a partially assembled disc drive 200, consistent with various aspects of the present disclosure. A base deck 205 interfaces with a seal 217 that provides a temporary/non-hermetic seal of an atmosphere within a cavity defined by the base deck 205 and the seal 217. The seal 217 may be coupled to the base deck 205 via screws, glue, or other fastener. After installing the seal 217, the desired low-density atmosphere is injected into the cavity via an access port 218 (or introduced prior to coupling the seal to the base deck 205), which is thereafter sealed.

The disc drive 200 may then be tested to determine operational characteristics of the disc drive in the low-density atmosphere. Where the disc drive 200 fails the test, the seal 217 may be removed and the disc drive components reworked as necessary. The seal 217 (or a new seal) may then be (re)installed on the base deck 205 and retested. After confirmation that the disc drive 200 is functioning properly in the low-density atmosphere, a cover is friction-stir welded to a periphery of the base deck 205, hermetically sealing the low-density atmosphere within the disc drive cavity.

Figure 3:
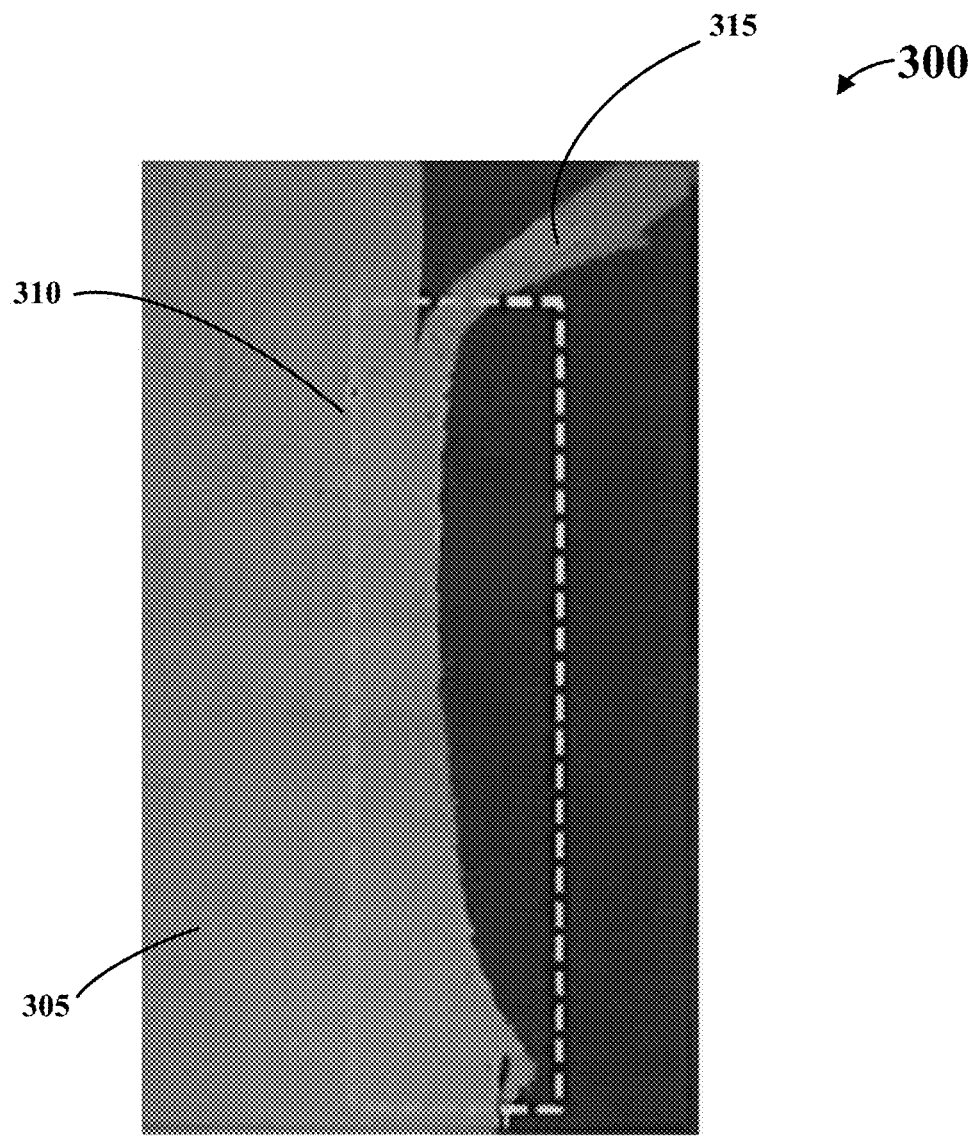
FIG. 3 is a partial cross-sectional view of a disc drive apparatus consistent with various aspects of the present disclosure.

FIG. 3 shows a partial cross-sectional view of a disc drive apparatus 300 consistent with various aspects of the present disclosure. The disc drive apparatus 300 has been hermetically sealed via a friction-stir welding method consistent with one or more embodiments of the present disclosure. A friction-stir weld tool forms the weld by generating heat between the tool, a cover 315, and a base deck 305 (e.g., via friction induced by operating the friction-stir weld tool at 12,000 RPM or higher in contact with the base deck and cover) which heats the material of the base deck and cover to create soft regions on the lip and the base deck adjacent the tool. The friction-stir weld tool mechanically mixes and joins the soft regions using mechanical pressure induced by the tool, thereby blending a portion of material from the cover 315 with a portion of material from the base deck 305 to form the weld region 310. The resulting weld region 310 fully blends the materials of the cover and the base deck, providing desirable weld characteristics including no visible discontinuities which may otherwise allow for the passage of gas into or out of the disc drive cavity.

Figure 4:
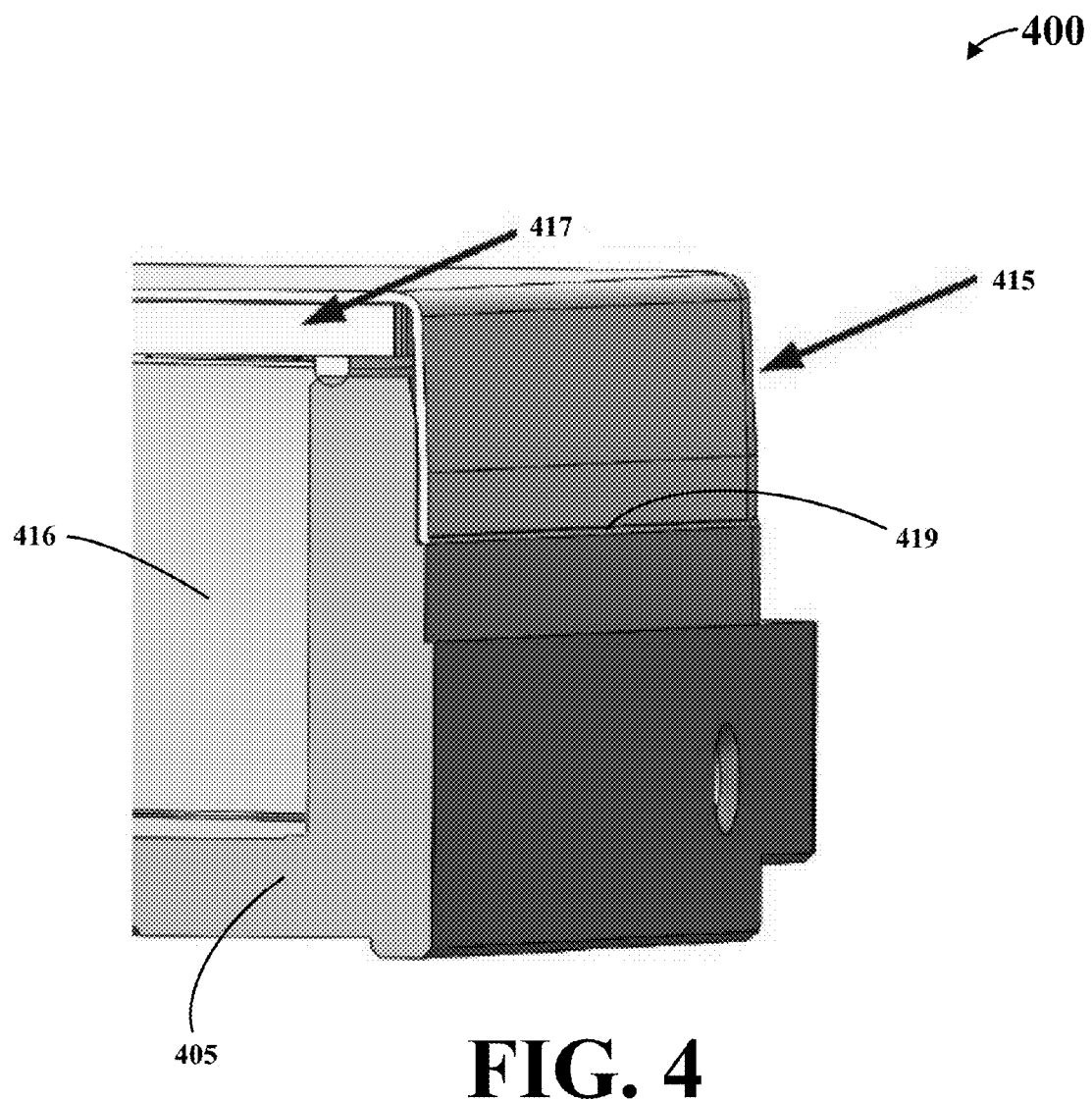
FIG. 4 is a partial cross-sectional view of a disc drive apparatus, consistent with various aspects of the present disclosure.

FIG. 4 is a cross-sectional view of a disc drive apparatus 400, consistent with various aspects of the present disclosure. The disc drive apparatus 400 includes a base deck 405 coupled to a process cover 417 to form a temporary seal for maintaining a low-density atmosphere within a disc drive cavity 416. A final cover 415 is then inserted over the process cover 417 and an upper portion of the base deck 405. A hem feature 419 extends laterally from a periphery of the final cover 415. A friction-stir weld is employed along the final cover 415 and the base deck 405. In some implementations, the hem feature 419 is incorporated into the friction-stir weld and provides additional material therefor (e.g., to fill in gaps due to fitment and tolerances of the base deck 405 to the final cover 415).

Figure 5:
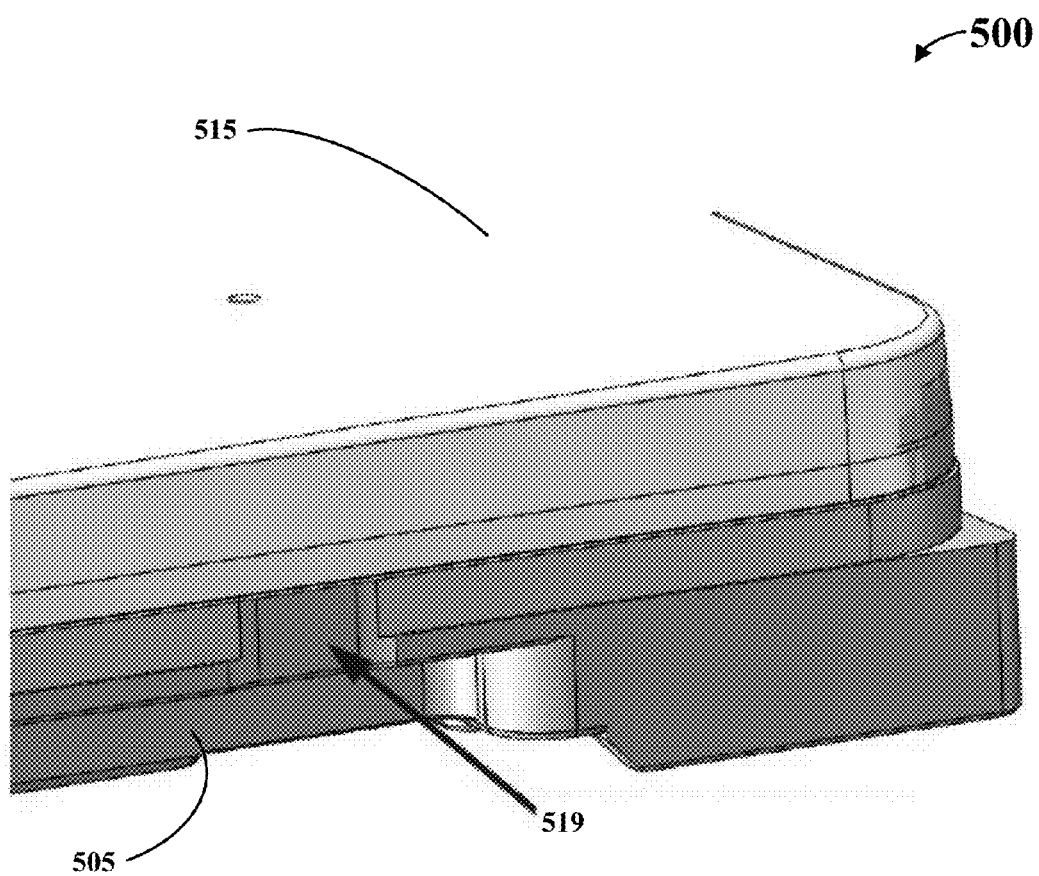
FIG. 5 is an isometric view of a disc drive apparatus, consistent with various aspects of the present disclosure.

FIG. 5 is an isometric view of a disc drive apparatus 500, consistent with various aspects of the present disclosure. The disc drive apparatus 500 includes a base deck 505 having one or more recess features 519 adjacent a weld joint between the base deck and a final cover 515. The base deck 505 and the final cover 515 are joined by a friction-stir weld. During a welding process in which the friction-stir weld is formed, the one or more recess features 519 provide a path for excess weld material to flow out of the ensuing weld zone. Excess weld material may, for example, result from fitment of the base deck 505 and cover 515, and/or thermal expansion of the welded components. The one or more recess features 519 mitigate or prevent undesirable weld characteristics, such as convex welds which extend beyond a desired form factor of the disc drive apparatus 500 (often requiring a secondary machining operation).

Based upon the above discussion and illustrations, those skilled in the art will readily recognize that various modifications and changes may be made to the present disclosure without strictly following the exemplary embodiments and applications illustrated and described herein. For example, the shape and location of the joints and friction-stir welding methodologies need not conform to the exemplary embodiments discussed herein; hermetically sealed apparatuses as claimed may cover a wide variety of shapes and variations of such a welded/hermetically sealed structure, including irregular joints (e.g., mechanical labyrinths), non-parallel joints, and welding components with varying length/width/thickness. Such modifications do not depart from the true spirit and scope of the present disclosure, including that set forth in the following claims.

What is claimed is:

1. A disc drive apparatus comprising:
a base deck including a cavity defined by sidewalls having inner surfaces;
a cover that encloses the cavity, the cover including a planar inner surface that adjoins the inner surfaces of the sidewalls to enclose the cavity, and including a lip that extends along a periphery of the cover and over a top of the sidewalls, and that bends downward from the top over an outer surface of the sidewalls of the base deck; and
a friction-stir weld that joins a lower portion of the lip to the base deck along a vertical portion of the outer surface of the sidewalls, the friction-stir weld including a portion of first material from the lip blended with a portion of second material from the base deck, the friction-stir weld being configured and arranged with the cover and base deck to hermetically seal the cavity.

2. The disc drive apparatus of claim 1, wherein
the sidewalls have an upper surface upon which the inner surface of the cover lies, in which the inner surfaces and outer sidewalls extend down from the upper surface; and
the friction-stir weld extends through the lip and into a portion of the sidewalls recessed below the upper surface and along which the lip extends.

3. The disc drive apparatus of claim 1, wherein a weld depth of the friction-stir weld varies in accordance with a thickness of one or more features of the base deck proximate the friction-stir weld, with the weld depth being greater where the friction-stir weld is proximate thicker features of the base deck, relative to the weld depth where the friction-stir weld is proximate thinner features of the base deck.

4. The disc drive apparatus of claim 1, wherein the cover includes the first material, the first material being different than the second material.

5. The disc drive apparatus of claim 1, wherein
the base deck includes a first aluminum alloy,
the cover includes a second aluminum alloy that is different than the first aluminum alloy, and
the friction-stir weld includes an alloy having portions of both the first aluminum alloy and the second aluminum alloy.

6. The disc drive apparatus of claim 1, wherein
the base deck includes a bottom portion having a sidewall extending therefrom, the bottom portion and the sidewall defining the cavity therein;
the cover includes a first portion that extends over and encloses the cavity, and a second portion that includes the lip, the lip having an elongated portion that extends along and around an outer surface of the sidewall; and
the friction-stir weld extends through a lower portion of the lip and into the sidewall, and joins the lower portion of the lip to the sidewall along a periphery of the sidewall, thereby hermetically sealing the cavity.

7. The disc drive apparatus of claim 6, wherein an interface between the cover and the base deck provide a lap joint, and the friction-stir weld joins the cover to the base deck along the lap joint.

8. The disc drive apparatus of claim 1, wherein
the sidewalls extend around a periphery of the base deck and the inner surfaces form a lateral boundary of the cavity;
the cover forms an upper boundary of the cavity, with the planar inner surface interfacing with an upper surface of the sidewalls and the lip extending from the planar inner surface of the sidewalls; and
the friction-stir weld extends through the lower portion of the lip and into the outer surface of the sidewalls, includes a portion of material from the lip that is blended with a portion of material from the sidewalls, and is impermeable to a helium atmosphere within the cavity.

9. The disc drive apparatus of claim 1, further including a secondary cover positioned between the cover and a low density atmosphere within the cavity, the secondary cover configured and arranged to retain low density atmosphere within the cavity, prior to the friction-stir weld being formed.

10. The disc drive apparatus of claim 1, wherein the friction-stir weld is configured and arranged with the cover and the base deck to hermetically seal the cavity, therein providing a total rate of atmosphere leakage through the friction-stir weld that is not greater than 1 $cm^3$/year ($1\times10^{-8}$ $cm^3$/sec).

11. A method for forming a disc drive apparatus, the method including the steps of:
providing a base deck including a cavity defined by sidewalls having inner surfaces and an outer surface, the outer surface defining a lateral perimeter of the sidewalls;
providing a cover that encloses the cavity, the cover including a planar inner surface that adjoins an upper portion of the inner surfaces of the sidewalls to enclose the cavity, and including a lip that extends along a periphery of the cover and that bends over the outer surface of the sidewalls of the base deck and extends down from the upper portion along the outer surface; and
hermetically sealing the cavity within the base deck by-friction-stir welding a lower portion of the lip to the base deck along the outer surface of the sidewalls, with a portion of first material from the lip blended with a portion of second material from the base deck, therein forming a friction-stir weld.

12. The method of claim 11, wherein the cover includes the first material and the first material is different than the second material.

13. The method of claim 11, wherein the step of hermetically sealing the cavity further includes mitigating overheating of disc drive components within the cavity by cooling the base deck and the cover while joining the cover to the base deck.

14. The method of claim 11, wherein the step of hermetically sealing the cavity includes varying a weld depth of the friction-stir weld based on a thickness of one or more features of the base deck proximate the friction-stir weld.

15. The method of claim 11 further includes, prior to hermetically sealing the cavity,
applying a first seal to the base deck and using the first seal to retain a low density atmosphere in the cavity, and verifying operation of disc drive components in the cavity while using the first seal to retain the low density atmosphere within the cavity.

16. The method of claim 11, wherein the step of hermetically sealing the cavity further includes isolating disc drive components within the cavity from vibration induced upon the disc drive components by the friction-stir welding.

17. The method of claim 11, wherein the step of hermetically sealing the cavity includes contacting both the cover and the base deck with a friction-stir weld tool rotating at greater than 12,000 rotations per minute.

18. The method of claim 11, wherein the step of hermetically sealing the cavity includes contacting both the cover and the base deck with a friction-stir weld tool inclined at an angle, relative to a welded surface of the cover, of greater than seven degrees from a perpendicular to the surface.

19. The method of claim 11, wherein the step of hermetically sealing the cavity includes contacting both the cover and the base deck with a friction-stir weld tool at a constant force along a length of the friction-stir weld.

20. A method for forming a disc drive apparatus, the method including the steps of:
applying a first seal to a base deck having a cavity defined by sidewalls having inner surfaces and containing a disc drive assembly therein, and using the first seal to retain a low density atmosphere in the cavity;
verifying operation of the disc drive assembly by testing the assembly while using the first seal to enclose a low density atmosphere;
in response to the verification being indicative of a failure of the disc drive,
removing the first seal,
reworking the disc drive assembly,
applying a second seal to the base deck and using the second seal to retain a low density atmosphere in the cavity, and
verifying operation of the disc drive assembly by testing the assembly while using the first seal to enclose a low density atmosphere; and
in response to verifying proper operation of the disc drive, hermetically sealing the cavity by joining a cover to the base deck via a friction-stir weld, the cover enclosing the cavity and including a planar inner surface that adjoins the inner surfaces of the sidewalls to enclose an upper end of the cavity, and having a lip that extends along a periphery thereof and bends over an outer surface of the sidewalls of the base deck and extends down along the outer surface away from the upper end of the cavity, the friction-stir weld including a portion of material from the lip blended with a portion of material from the base deck that is different than the material from the lip.

* * * * *